(12) United States Patent
Soika et al.

(10) Patent No.: US 8,091,207 B2
(45) Date of Patent: Jan. 10, 2012

(54) METHOD OF LAYING A SUPERCONDUCTOR CABLE

(75) Inventors: Rainer Soika, Hannover (DE); Arnaud Allais, Saint Julien (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 12/610,672

(22) Filed: Nov. 2, 2009

(65) Prior Publication Data

US 2010/0275437 A1 Nov. 4, 2010

Related U.S. Application Data

(62) Division of application No. 11/656,824, filed on Jan. 23, 2007, now Pat. No. 7,979,976.

(30) Foreign Application Priority Data

Feb. 16, 2006 (EP) ..................................... 06290288

(51) Int. Cl.
*H01R 4/68* (2006.01)
*H02G 15/34* (2006.01)

(52) U.S. Cl. ........................ 29/599; 174/125.1

(58) Field of Classification Search ................... 29/599; 174/125.1, 15.5
See application file for complete search history.

(56) References Cited

U.S. PATENT DOCUMENTS

| | | | | |
|---|---|---|---|---|
| 3,839,689 A | * | 10/1974 | Biltcliffe et al. | 335/216 |
| 7,237,317 B2 | * | 7/2007 | Schippl | 29/599 |
| 2004/0256143 A1 | | 12/2004 | Ashibe et al. | |
| 2006/0011377 A1 | | 1/2006 | Schmidt et al. | |

FOREIGN PATENT DOCUMENTS

EP 1489692 A2 * 12/2004

* cited by examiner

*Primary Examiner* — Livius R Cazan
(74) *Attorney, Agent, or Firm* — Sofer & Haroun, LLP

(57) ABSTRACT

A method for laying a superconductor cable having a superconductive cable core and a cryostat enclosing the superconductive cable core, with the superconductive cable core being arranged freely mobile in the cryostat. The method includes cooling the superconductive cable core to the operating temperature after laying the superconductor cable, shortening the superconductive cable core relative to the cryostat, fixing the superconductive cable core at its ends; and mounting terminations on the ends of the cable core.

1 Claim, 4 Drawing Sheets

METHOD OF LAYING A SUPERCONDUCTOR CABLE

RELATED APPLICATIONS

This application is a divisional application of U.S. patent application Ser. No. 11/656,824, filed on Jan. 23, 2007, now U.S. Pat. No. 7,979,976, which in turn claims the benefit of priority from European Patent Application No. 06290288.7, filed on Feb. 16, 2006, the entirety of which are incorporated herein by reference.

BACKGROUND

1. Field of the Invention

The invention relates to a method for laying a superconductor cable.

2. Description of Related Art

Superconductor cables contract when they are cooled to operating temperature and expand when they are heated, for example in the event of a fault. In such a situation, in particular, the end regions of the superconductor cable move in the longitudinal direction of the cable. The order of magnitude of the length change is ~0.3%. The end regions of the superconductor are connected to normal conductors, whose other end is connected to the conductors of a so-called feed-through. Via the feed-through, the superconductor cable is connected to an electricity mains.

Especially with long cable lengths, controlling the contraction and expansion at the ends of the cables presents considerable problems.

It is known from EP 1 489 692 to connect the end of the superconductor cable to the termination of a stranded copper conductor. Contractions and expansions are thereby absorbed at the cable ends, and no forces are incurred on the statically placed termination. A disadvantage with this solution is that in the event that the superconductor cable expands, especially with long cable lengths, it is very difficult to guide the stranded conductor which is at a high voltage, and it is to be feared that the stranded conductor will enter into contact with the connection point between the superconductor cable and the housing which encloses the termination.

EP 1 617 537 A2 discloses a termination for a superconducting cable, in which the electrical conductor of the termination is electrically connected to the superconductive conductor of the cable via a tubular component made of electrically conductive material. With this solution, the conductor can slide in the component.

In a further solution to the problem, which is described in the Applicant's prior EP Application 0 529 092.4, expansion or contraction of the superconductor cable is prevented. The superconducting cable core laid in a cryostat extends inside the cryostat in the form of a corrugation or coil when the cable core is at room temperature. This is achieved by fastening a cross-like network of a material with a low thermal expansion coefficient to the cable core on particular points at longitudinal axial intervals. At operating temperature, the cable core extends substantially parallel to the cryostat, whereas at room temperature it extends in a corrugated or coiled shape. Movement of the ends of the cable core in the longitudinal axial direction is prevented by the network.

OBJECTS AND SUMMARY

It is an object of the invention to provide a method for laying a superconductor cable, in which contractions and expansions of the superconductive cable core can be controlled in a particularly straightforward way.

By fixing the ends of the superconductive cable core after cooling to operating temperature, the cable core will lie with a corrugated shape or coiled shape inside the cryostat in the event of reheating if the cable is switched off or if a fault occurs.

According to a particularly advantageous configuration of the invention, the ends of the cable core are releasably connected to the terminations. The advantage offered by this is that the connections between the ends of the cable core and the terminations can be released before switching off or in the event of a fault, so that the cable core can expand unimpeded.

BRIEF DESCRIPTION OF THE DRAWINGS

The invention is explained in more detail with the aid of the exemplary embodiments schematically represented in FIGS. 1 to 4.

DETAILED DESCRIPTION OF THE PREFERRED EMBODIMENTS

Figure 1:
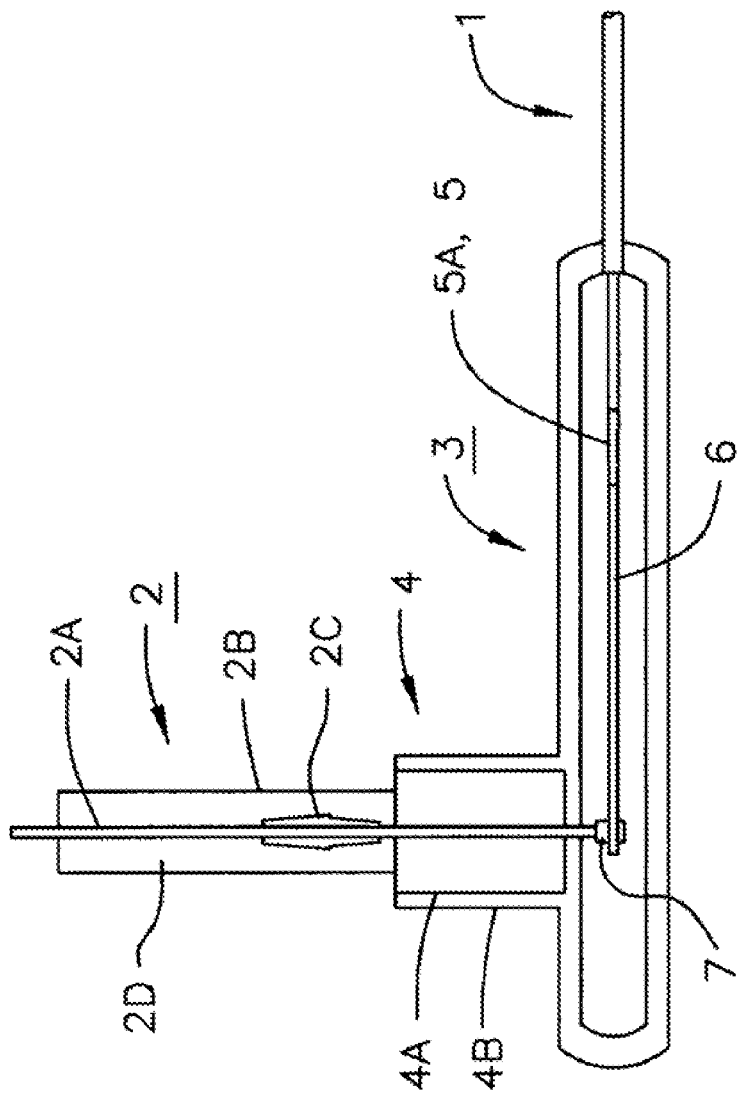
FIG. 1 shows a termination for a superconductor cable, as is known from EP 1 617 537.

As is known per se, the superconductor cable 1 consists of a superconductive cable core and a cryostat enclosing the cable core.

The termination 2 consists of an electrical conductor 2a, an insulator 2b enclosing the electrical conductor 2a and a field control element 2c. The interior 2d of the insulator 2b is conventionally filled with insulating oil.

A housing which encloses the cable end and the connection point between the conductor 5 of the superconductor cable 1 and the electrical conductor 2a is denoted by 3. On the housing 3, there is a tube connector 4 which concentrically encloses the electrical conductor 2a. The tube connector 4 is designed with two walls 4a and 4b, the space between the two walls 4a and 4b being filled with super insulation and evacuated. The space lying between the electrical conductor 2a and the inner wall 4a is filled with an insulating material, preferably a foam.

That end 5a which is free from the insulator layer (not shown in detail), of the superconductive conductor 5 which consists of a central element e.g. compressed stranded copper wires and a plurality of superconductive material bands wound around the central element, is connected to a copper shaft or tube 6. The ends of the individual superconductive bands are electrically conductively connected to the surface of the shaft or tube 6. Via a component 7, the shaft or the tube 6 is attached electrically conductively to the electrical conductor 2a. In order to absorb the fortes occurring because of expansion or contraction of the cable core of the superconductor cable 1, provision is made here to arrange the tube or the shaft 6 so that it can be displaced longitudinally in the component 7.

The invention is intended to adopt a different approach.

Figure 2:
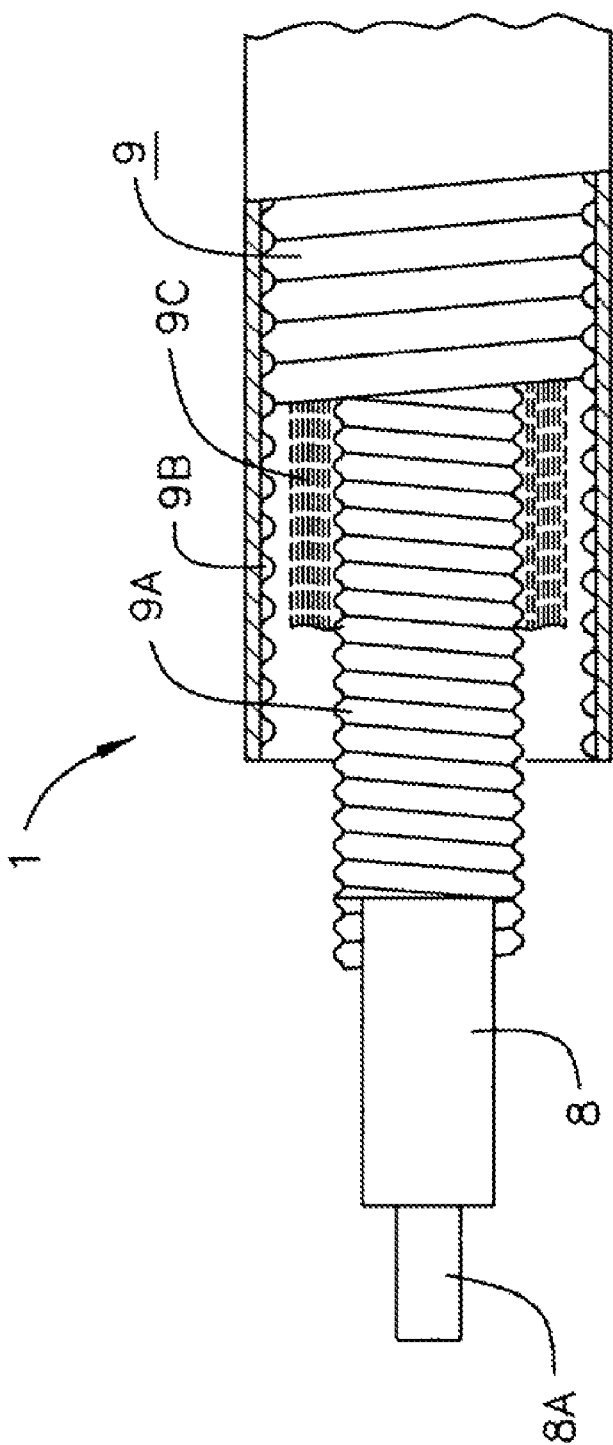
FIG. 2 shows an end of the superconductor cable in accordance with one embodiment of the present invention.
Figure 3:
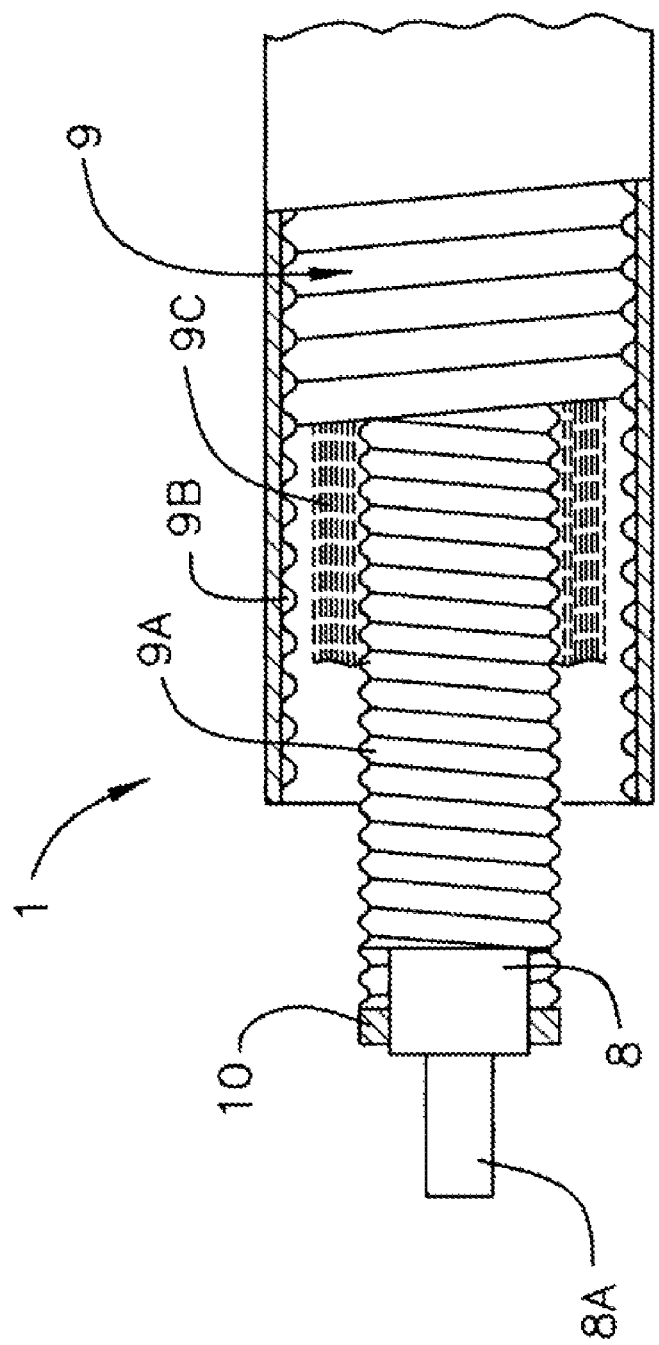
FIG. 3 shows an end of the superconductor cable in accordance with one embodiment of the present invention.

As can be seen from FIGS. 2 and 3, the cable core 8 is arranged freely mobile in a cryostat 9. The cryostat consists of at least two corrugated metal tubes 9a and 9b arranged concentrically with one another, between which an insulator layer 9c of metal-coated plastic sheet is arranged.

The end of the superconductor cable is shown in FIG. 2, the superconductor cable 1 being at ambient temperature. The cable core 8 has a longer length than the cryostat 9, i.e. the ends protrude out of the cryostat 9.

After laying the superconductor cable 1, the cable core 8 is cooled to operating temperature by feeding a refrigerant through the angular gap between the cable core 8 and the inner corrugated tube 9a. Liquid nitrogen at a temperature of the order of 70 K is conventionally used as the refrigerant.

As a result of the cooling, the cable core 8 contracts and is thus drawn back inside the cryostat 1. The cooled state is represented in FIG. 3. The cable core 8 is now fixed relative to the cryostat at both ends. As one of many possibilities, a metal ring 10 is mechanically connected firmly both to the surface of the cable core 8 and to the corrugated tube 9a of the cryostat 9.

Lastly, the termination is mounted on the conductor 8a. If the superconductor cable 1 subsequently needs to be disconnected from the mains e.g. because of a fault, and the cable core 8 consequently heats up, then it will expand. Since it is fixed relative to the cryostat 1 at both ends, the cable core 8 deforms and becomes deployed in the form of a corrugation or a coil inside the cryostat. Since the overall length change of the cable is compensated for in the cryostat, the length change which acts on the end 5a, seated in the housing 3, of the superconductive conductor 5 as well as the inner conductor 2a connected thereto is negligible.

Figure 4:
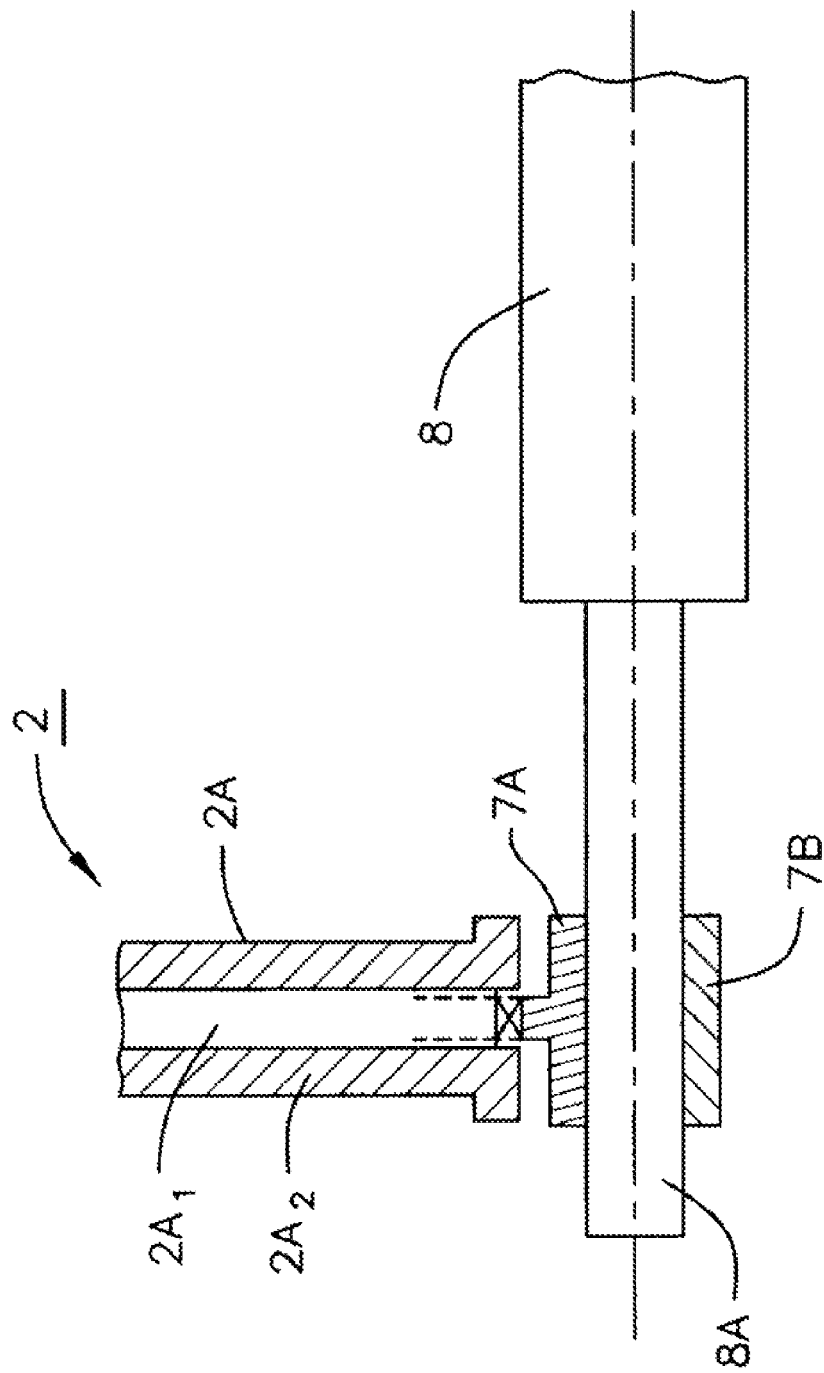
FIG. 4 shows a termination and cable core connection in accordance with one embodiment of the present invention.

A further embodiment of the invention is schematically represented in FIG. 4.

In this exemplary embodiment as well, the connection between the conductor 8a of the cable core 8 and the conductor 2a of the termination 2 is established after cooling the cable core to operating temperature.

The conductor 2a comprises an inner part $2a_1$ and an outer part $2a_2$. The inner part $2a_1$ is arranged so that it can be displaced longitudinally in the outer part $2a_2$. By means of a screw thread (not shown in detail) on the inner surface of the outer part $2a_2$ and a screw thread on the outer surface of the inner part $2a_1$, the inner part $2a_1$ can be moved in the longitudinal direction of the conductor 2a when the inner part $2a_1$ is rotated.

At its end facing the conductor 8a of the cable core 8, the inner part $2a_1$ is connected rotatably to a half-wall 7a which, together with a half-wall 7b, encloses the conductor 8a of the cable core 8 when the superconductor cable 1 is in operation. After cooling the cable core 8, the half-wall 7a is moved by rotating the part $2a_1$ onto the conductor 8a and encloses it together with the half-wall 7b, thereby establishing an electrically conductive connection.

When the superconductor cable is disconnected from the mains and the cable core heats up, thereby expanding, the electrical connection is interrupted by an away movement of the half-wall 7a and the conductor 8a can move freely between the half-walls 7a and 7b.

The advantage of this configuration is that the cable can retract or expand freely when it is cooled and heated. In particular, no forces due to the length change act transversely on the inner conductor 2a of the termination 2.

The invention claimed is:

1. A method for arranging a superconductor cable having a superconductive cable core within a cryostat enclosing the superconductive cable core, said cryostat having two corrugated metal tubes arranged concentrically at a distance from one another between which an insulator layer of a metal-coated plastic sheet is arranged, with the superconductive cable core being arranged freely mobile in the cryostat, said method comprising the steps of:

laying the superconductive cable core into the cryostat with an overlength in comparison to the axial length of said cryostat;

after laying the superconductive cable core, cooling the superconductive cable core to the operating temperature, thereby shortening the superconductive cable core relative to the cryostat;

after cooling the superconductive cable core, connecting the shortened superconductive cable core at each of its two ends to a conductor of a termination which has an inner part that can be displaced longitudinally by rotation within an outer part by use of a screw connection and a first half-shell being connected to the inner part of the conductor;

moving the first half-shell onto a conductor of the superconductive cable by rotation of the inner part of the conductor of the termination and enclosing the same together with a second half-shell, thereby establishing an electrically conductive connection; and when the superconductive cable core heats up, moving the first half-shell away from the superconductive cable core by rotating the inner part of the conductor of the termination in the opposite direction such that the superconductive cable core can move freely between the two half-shells.

* * * * *